(12) United States Patent
Jones et al.

(10) Patent No.: US 9,815,970 B2
(45) Date of Patent: Nov. 14, 2017

(54) EFFECT PIGMENTS

(71) Applicant: BASF SE, Ludwigshafen (DE)

(72) Inventors: Steven Jones, Budd Lake, NJ (US); Meaghan Clark McGuire, Nanuet, NY (US); James Sioss, Broadview Heights, OH (US); Christopher Sichmeller, Elmsford, NY (US); Martin Saltzman, Nelsonville, NY (US)

(73) Assignee: BASF SE, Ludwigshafen (DE)

( * ) Notice: Subject to any disclaimer, the term of this patent is extended or adjusted under 35 U.S.C. 154(b) by 195 days.

(21) Appl. No.: 14/718,501

(22) Filed: May 21, 2015

(65) Prior Publication Data

US 2015/0344677 A1 Dec. 3, 2015

Related U.S. Application Data

(60) Provisional application No. 62/004,007, filed on May 28, 2014, provisional application No. 62/137,918, filed on Mar. 25, 2015.

(51) Int. Cl.
| | |
|---|---|
| *C08K 9/02* | (2006.01) |
| *C08K 3/16* | (2006.01) |
| *C08K 3/34* | (2006.01) |
| *C09C 3/06* | (2006.01) |
| *C09C 1/00* | (2006.01) |

(52) U.S. Cl.
CPC ............ *C08K 9/02* (2013.01); *C08K 3/16* (2013.01); *C08K 3/34* (2013.01); *C09C 1/0015* (2013.01); *C09C 1/0024* (2013.01); *C09C 3/063* (2013.01); *C01P 2002/01* (2013.01); *C01P 2002/85* (2013.01); *C01P 2004/04* (2013.01); *C01P 2006/65* (2013.01); *C01P 2006/66* (2013.01); *C09C 2200/102* (2013.01); *C09C 2200/301* (2013.01); *C09C 2200/401* (2013.01); *C09C 2200/403* (2013.01)

(58) Field of Classification Search
CPC ........... C09C 1/36; C09C 1/24; C09C 1/0015; C09C 1/0024; C09C 3/063; C09C 2200/50; C09C 2200/505; C09C 2200/10
See application file for complete search history.

(56) References Cited

U.S. PATENT DOCUMENTS

| | | |
|---|---|---|
| 4,373,963 A | 2/1983 | Uenishi et al. |
| 4,435,220 A | 3/1984 | Watanabe et al. |
| (Continued) | | |

OTHER PUBLICATIONS

International Search Report dated Aug. 26, 2015.

*Primary Examiner* — Pegah Parvini
(74) *Attorney, Agent, or Firm* — Foley & Lardner LLP

(57) ABSTRACT

A high chroma effect pigment includes a platelet substrate and an optical coating formed on the platelet substrate. The optical coating includes a first high refractive index layer, a second high refractive index layer on the first high refractive index layer, and a diffused third material having a range of diffusion between 100% to partial diffusion in the first high refractive index layer, the second high refractive index layer, or both the first and the second high refractive index layers. The first and second high refractive index layers independently have a refractive index of about >1.65. The diffused third material is $SiO_2$ or a metal oxide is different than the first and second high refractive index layers.

26 Claims, 9 Drawing Sheets

(56) References Cited

U.S. PATENT DOCUMENTS

| | | | |
|---|---|---|---|
| 4,744,832 A * | 5/1988 | Franz | C09C 1/0015 |
| | | | 106/418 |
| 4,780,140 A | 10/1988 | Franz et al. | |
| 5,711,798 A | 1/1998 | Shio et al. | |
| 5,738,717 A * | 4/1998 | Oulsnam | C09C 1/24 |
| | | | 106/456 |
| 5,985,020 A | 11/1999 | Andes et al. | |
| 6,132,873 A | 10/2000 | Dietz et al. | |
| 6,692,561 B1 * | 2/2004 | Schoen | C09D 5/36 |
| | | | 106/417 |
| 8,524,261 B2 | 9/2013 | Schmidt et al. | |
| 2005/0061205 A1 | 3/2005 | Kobayashi et al. | |
| 2007/0039521 A1 | 2/2007 | Zimmerman et al. | |
| 2007/0048239 A1 | 3/2007 | Song et al. | |
| 2007/0056470 A1 | 3/2007 | Fuller et al. | |
| 2008/0181921 A1 * | 7/2008 | DeLuca | C09C 1/0024 |
| | | | 424/401 |
| 2008/0274198 A1 * | 11/2008 | Schweinfurth | A23L 5/42 |
| | | | 424/489 |
| 2010/0218703 A1 | 9/2010 | Bujard et al. | |
| 2011/0306678 A1 | 12/2011 | Liu et al. | |

* cited by examiner

EFFECT PIGMENTS

This application takes the benefit of U.S. Provisional Application Serial Nos. 62/004,007 filed May 28, 2014 and 62/137,918 filed Mar. 25, 2015 herein both incorporated entirely by reference.

TECHNICAL FIELD

This disclosure relates to effect pigments coated with high refractive index layers and diffusion of low index material therein to increase the chroma of the effect pigment, to methods of making and uses thereof in paint, ink-jet ink, printing inks, coatings, industrial coatings, automotive coating, printing ink, plastics, cosmetics or cosmetic formulations, and glazes for ceramics or glass.

BACKGROUND

Effect pigments have also been referred to as gloss pigments, lustrous pigments, pearlescent pigments, or interference pigments. Such pigments having a core consisting of a transparent or nontransparent material are known, such as, for example, natural or synthetic mica, $SiO_2$, aluminum or glass. These cores are coated with a high refractive index material, generally a metal oxide of refractive index greater than about 1.65.

Furthermore, it is possible to obtain pigments that are more intense in color (i.e., having higher chroma) by applying alternating high and low refractive index layers on a substrate.

However, increasing the chroma of effect pigments formed from a platelet diameter ($d_{50}$) equal to or less than about 15 microns is difficult using alternating high/low refractive index distinct layers. Deposition or co-deposition of a low refractive index distinct layer on the high refractive index layer often leads to agglomeration when the platelet diameter is 15 microns or less.

Thus, it would be useful to develop new ways of making high chroma effect pigments rather than the conventional method of stacking independent and separate alternating high/low refractive index layers on a substrate.

SUMMARY

Surprisingly the chroma of effect pigments may be enhanced by the presence of an oxide of a diffused third material between a first and a second high refractive index layers, wherein the diffused third material has a range of diffusion between 100% to partial diffusion into one or both the first and the second high refractive index layers.

Additionally, secondary advantages have been discovered when the diffused third material is so diffused.

Examples of these other advantages include, more efficient use of raw material(s) and/or a more efficient effect pigment during use, that is, a lower wt. % of coating material (i.e., less high refractive index material(s)) is required to achieve the same appearance as traditional effect pigments with alternating distinct layers of high and low refractive index materials in a given application. The present method also provides an advantage in forming high chroma pigments whose platelet size is about 15 microns or less in that deposition of a low refractive index material such as $SiO_2$ does not cause agglomeration.

Accordingly, disclosed herein is an effect pigment comprising
a platelet coated with
an optical coating and the optical coating comprises:
a first high refractive index layer;
a second high refractive index layer formed on the first high refractive index layer; and
a diffused third material wherein the diffused third material has a range of diffusion between 100% to partial diffusion into one or both the first and the second high refractive index layers;
wherein the first and second high refractive index layers are formed from high index materials having a refractive index of about >1.65, for example the first and second high refractive index layers are selected independently from the group consisting of $SnO_2$, $TiO_2$, $Cr_2O_3$, ZnO, $ZrO_2$, iron oxides (such as $Fe_3O_4$, $Fe_2O_3$), copper oxides, cobalt oxides, manganese oxides, alumina, and mixtures thereof;
the diffused third material is $SiO_2$ or a metal oxide, for example the diffused third material is selected from the group consisting of $Al_2O_3$, $SnO_2$, $SiO_2$, cobalt oxides, magnesium oxide, manganese oxide, copper oxides, iron oxides (i.e., $Fe_2O_3$, $Fe_3O_4$), $B_2O_3$, $TiO_2$, $Cr_2O_3$, ZnO, $ZrO_2$, and mixtures thereof;
with the proviso that the diffused third material is different than the first and second high refractive index layers.

A special embodiment covers:
An effect pigment comprising
a platelet coated with
an optical coating and the optical coating comprises:
a first $TiO_2$ layer;
a second $TiO_2$ layer formed on the first $TiO_2$ layer; and a diffused third material is $SiO_2$ between the first $TiO_2$ layer and second $TiO_2$ layer and has a range of diffusion between 100% to partial diffusion into one or both the first and second $TiO_2$ layers. The $TiO_2$ layers may be rutile or anatase.

Furthermore, several methods are disclosed. These methods include the making of the above effect pigment and a method of increasing the chroma of an effect pigment as described above by coating a platelet with an optical coating comprising the steps of incorporating a diffused third material between a first high refractive index layer and a second high refractive index layer wherein the second high refractive index layer is formed on the first high refractive index layer and the diffused third material has a range of diffusion between 100% to partial diffusion into one or both the first and the second high refractive index layers.

DETAILED DESCRIPTION

Figure 1A:
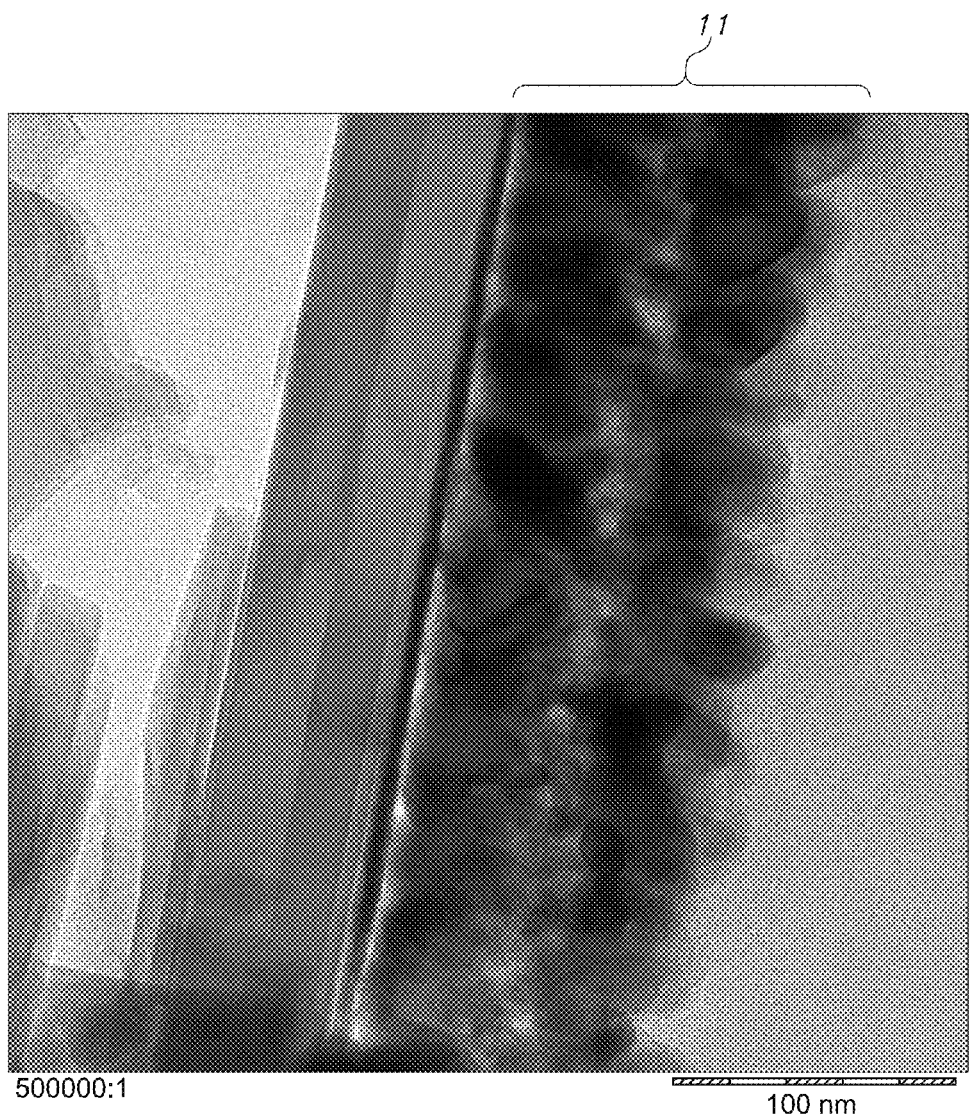
FIG. 1A is a High Resolution Transmission Electron Microscopy (TEM) of a cross-section of the effect pigment of Example 2.

FIGS. 1-5 show an effect pigment including a substrate 4, having an optical coating 11 thereon.

The substrate 4 is a platelet or platy substrate having a diameter which is greater than the thickness of the substrate, such as platelets (flakes). A platelet substrate includes platy, plate-like and flakey substrates.

The platelet is generally a platelet substrate, and is not spherical. In an example, the largest dimension of the platelet substrate ranges from about 1 μm (micron) to about 1 mm (millimeter).

The diameter is defined for example as the $d_{50}$ particle size distribution determined via static light scattering using a Malvern Mastersizer® Hydo2000S.

There are special advantages in the formation of an effect pigment which has a $d_{50}$ of about 15 microns or less with the present method. The present method of forming the optical coating of higher chroma is advantageous for substrates of about 15 microns or less because in contrast to the typical formation of high/low refractive index layers on such substrates, agglomeration is minimized by the present method.

Thus the effect pigment may be formed using a platelet diameter ($d_{50}$) of about 15 microns or less, for example about 15 microns to 1 micron.

The substrate may be transparent or non-transparent.

Examples of suitable platelet substrates include such platy materials as aluminum oxide, platy glass, perlite, aluminum, natural mica, synthetic mica, bismuth oxychloride, platy iron oxide, platy graphite, platy silica, bronze, stainless steel, natural pearl, boron nitride, copper flake, copper alloy flake, zinc flake, zinc alloy flake, zinc oxide, enamel, china clay, porcelain, titanium oxide, platy titanium dioxide, titanium suboxide, zeolites, talc, kaolin, synthetic ceramic flakes, and combinations thereof.

In one embodiment, the substrate may be selected from the group consisting of natural mica, synthetic mica, perlite, platy glass, bismuth oxychloride and aluminum. Mica (natural and synthetic) is of special importance.

As defined above the substrate may be treated or untreated. For example, the substrate may be treated with tin oxide as a rutile director for the first high refractive index layer. For example, the substrate may be treated with virtually any agent such silicones and coupling agents. Alternatively, the substrate may be mechanically treated to smooth the surface, or plasma or radiation treatments to activate the surface before application of the optical coating.

FIGS. 1-5 show the substrate 4 coated with an optical coating 11. The optical coating 11 includes two adjacent, distinct and separate high refractive index layers, 1 and 2, respectively, and a diffused third material 3 which has a range of diffusion between 100% to partially diffusion into one or both of the first and second high refractive index layers 1 and 2, respectively. Each of the high refractive index layers is a separate distinct layer which extend from the respective interface surface to the remote surface with material there between.

The optical coating 11 has a total physical thickness after calcination. This total physical thickness includes the thickness of the first high refractive index layer 1, the thickness of the second high refractive index layer 2, and the diffused third material 5 in one or both of the first and second high refractive index layers including any discontinuous pockets 3 of diffused third material between the first and second high index layers. The total physical thickness is measured on one side of the platelet substrate. As such, the total physical thickness is equivalent to the distance from the remote surface 8 of the first high refractive index layer 1 closest to the surface of the platelet 4 to a remote surface 9 of the second high refractive index layer 2 furthest from the surface of the platelet substrate 4. The total physical thickness after calcination of the optical coating ranges from about 10 nm to about 700 nm. In other examples, the total physical thickness after calcination of the optical coating ranges from about 15 nm to about 600 nm, or from about 20 nm to about 550 nm. The above optical coating thickness after calcination ranges from about 15 nm to about 600 nm or about 20 nm to about 550 nm would not include for example an outer protective layer formed on the effect pigment, additional layers formed before or after depositions of the above first and second high refractive index layers.

Each high refractive index layer is formed from a material or materials having a refractive index greater than about 1.65. In an embodiment, the first and second refractive index layers are the same material, and in another embodiment, first and second refractive index layers are different materials. Examples of the first and/or second refractive index layers include $SnO_2$, $TiO_2$, $Cr_2O_3$, ZnO, $ZrO_2$, iron oxides (e.g., $Fe_3O_4$, $Fe_2O_3$), copper oxides, cobalt oxides, manganese oxides, alumina, and mixtures thereof.

In one example, the optical coating includes $Fe_2O_3$ as the first high refractive index layer, $Fe_2O_3$ as the second high refractive index layer, and $Al_2O_3$, $SnO_2$, $SiO_2$, or mixtures thereof as the diffused third material having a range of diffusion between 100% to partial diffusion into one or both the first and the second high refractive index layers. In another specific example, the optical coating includes rutile or anatase $TiO_2$ as the first high refractive index layer, rutile or anatase $TiO_2$ as the second high refractive index layer, and $SiO_2$ or $SnO_2$ as the diffused third material. In any of these examples, any of the platelet materials may be used as the substrate.

In another example, both the first high refractive index layer and the second high refractive index layer are selected from the group consisting of $TiO_2$ (rutile or anatase), $Fe_2O_3$, and mixtures thereof with $SiO_2$, $SnO_2$ or $Al_2O_3$) as the diffused third material. Thus one embodiment envisions an effect pigment comprising a platelet coated with an optical coating wherein the optical coating is at least:

the first or second high refractive index layers are $Fe_2O_3$;
the first or second high refractive index layers are $TiO_2$;
the first and second high refractive index layers are $Fe_2O_3$ or
the first and second high refractive index layers are $TiO_2$ Each of the high refractive index layers (1 and 2) is a separate and distinct layer which is defined as and extends between an interface surface (6 and 7, respectively) to a remote surface (8 and 9, respectively).

Figure 5A:
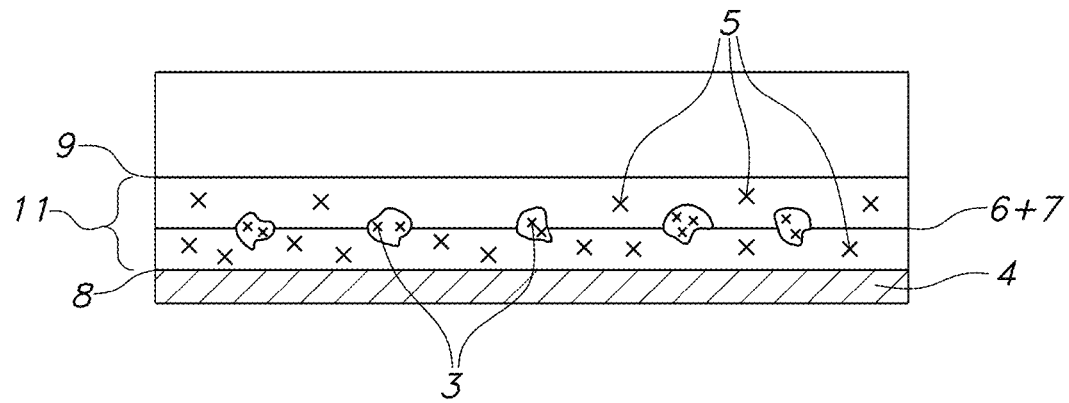
FIG. 5A shows a cross-sectional view of the present inventive effect pigment having partial diffusion including pockets of a diffused third material.
Figure 5B:
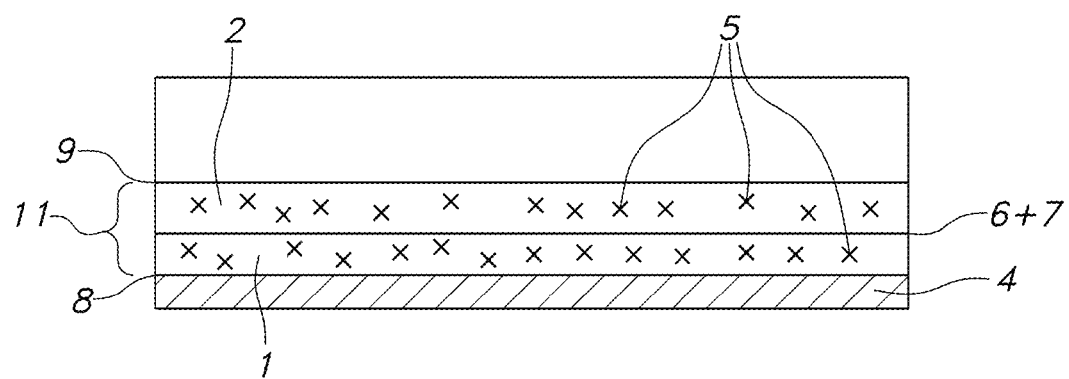
FIG. 5B shows a cross-sectional view of the present inventive effect pigment having complete diffusion of the diffused third material into the first and second layers.

Remote surfaces are the far surfaces (non-adjacent surfaces) of the first high refractive index layers 1 and second high refractive index layers 2. FIGS. 5A and 5B show the first remote surface 8 of the first refractive index layer 1 closest to the substrate 4 and the second remote surface 9 of the second refractive index layer 2 furthest from the substrate.

Further, each high refractive index layer also includes interface surface which is opposite to and spaced apart from the remote surface. The first high refractive index layer 1 and second high refractive index layer 2 are adjacent to one another at their respective interface surfaces, 6 and 7, respectively. The second high refractive index layer 2 is formed on the interface surface 6 of the first high refractive index layer 1 and there is no distinct or separate layer between the first and second high refractive index layers, 1 and 2, respectively.

FIGS. 5A and 5B show the first interface surface 6 of the first high refractive index layer 1 adjacent to the second interface surface 7 of the second high refractive index layer 2. The first interface surface 6 is adjacent and in contact with the second interface surface 7 at a number of points. FIG. 5B shows complete dispersion of the diffused third material 5 into the first high refractive index layer 1 and second high refractive index layer 2, and the interfaces surfaces, 6 and 7, respectively, are continuously in contact and adjacent to each other at all points. FIG. 5A shows discontinuous pockets 3 of the diffused third material 5 between the first interface surface 6 and the second interface surface 7. The first and second interface surfaces, 6 and 7, respectively, touch at various points and envelope the diffused third material 5 there between forming individual bubbles or pockets 3 of diffused third material 5 between the interface surfaces 6 and 7, as shown in FIGS. 5A and 3B.

The Figures show the diffused third material 5 which has a range of diffusion between 100% diffused to partially diffused in one or both the first and second high refractive index layers, 1 and 2, respectively.

The diffused third material 5 is an oxide and may be $SiO_2$ or a metal oxide material that is different than the first high refractive index layer 1 and second high refractive index layer 2. Some examples of the oxide suitable for use as diffused third material include $Al_2O_3$, $SnO_2$, $SiO_2$, cobalt oxides, magnesium oxide, manganese oxide, copper oxides, iron oxides (i.e., $Fe_2O_3$, $Fe_3O_4$), $B_2O_3$, $TiO_2$, $Cr_2O_3$, ZnO, $ZrO_2$, and mixtures thereof, for example $Al_2O_3$, $SnO_2$, $SiO_2$, cobalt oxides, magnesium oxide, manganese oxide, $B_2O_3$, $TiO_2$, ZnO and $ZrO_2$.

The diffused third material 5 is present in the optical coating 11 in an amount ranging from about 0.5 wt. % to about 11 wt. %, where the wt. % is based on the total weight of the optical coating on the platelet substrate. For example, the diffused third material 5 is present in the optical coating in an amount ranging from about 1 wt. % to about 9 wt. %, ranging from about 1.5 wt. % to about 8 wt. % where the wt. % is based on the total weight of the optical coating on the platelet substrate.

As such, this wt. % range is applicable for $Al_2O_3$, $SnO_2$, $SiO_2$, $B_2O_3$, $TiO_2$, $Fe_2O_3$, $Cr_2O_3$, ZnO, $ZrO_2$, cobalt oxides, magnesium oxide, manganese oxide, copper oxides, iron oxides, and mixtures thereof, for example $SiO_2$, $SnO_2$, $Al_2O_3$ or mixtures thereof as the diffused third material.

Figure 1B:
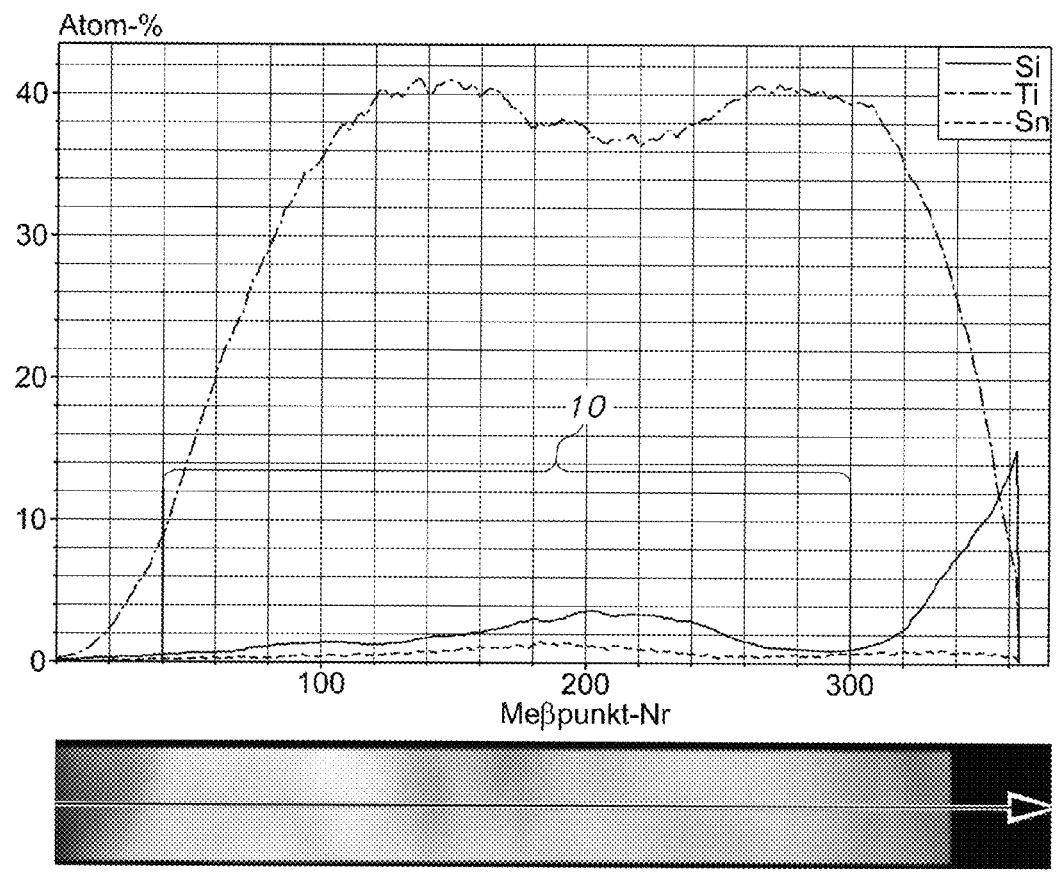
FIG. 1B is an Energy Dispersive X-Ray Spectroscopy (EDXS) in tandem with the TEM of a cross-section of the effect pigment shown in FIG. 1A.

The diffused third material 5 is present in the optical coating 11 as being at least partially diffused into one or both of the high refractive index layers 1 and 2 with or without pockets 3 of diffused third material 5 depending on the amount of diffusion. Diffusion of the diffused third material 5 is the migration of the diffused third material 5 into one or both the adjacent layers of the first high refractive index layers 1 and/or second high refractive index layers 2 such that the diffused third material 3 become part of the high refractive index layer between the interface layer and the remote layer of that high refractive index layer. The range of diffusion is between complete diffusion of the diffused third material or 100% diffusion with no pockets of concentrated diffused third material to partial diffusion of the diffused third material 5 which includes isolated pockets 3 of diffused third material 5 between the interfaces 6 and 7. The range of diffusion is determined by High Resolution Transmission Electron Micrograph (TEM-magnification 200000) and/or a cross-section Energy Dispersive X-Ray Spectroscopy (EDXS) in tandem with TEM of the calcined effect pigment. The direction of diffusion or travel of the diffused third material is from the interface surfaces, 6 and/or 7, of the adjacent high refractive index layers 1 and/or 2 toward the remote surfaces 8 and/or 9. This is shown in FIGS. 1B, 2B, 3B, and 4B which shows the cross sectional pictures of the calcined effect pigment using EDXS in tandem with TEM. FIG. 1B graphically shows the distribution of silicon at the interface surfaces of the first and second high refractive index layers toward the remote surfaces. Note the diffusion of silicon into the $TiO_2$ second high refractive index layer indicated by element 10.

The range of diffusion of the diffused third material 5 affects the nature of the high refractive index layers 1 and 2, and in turn affects the optical properties of the resulting effect pigment. As examples, the diffused third material 5 affects how one or both of the high refractive index layers are deposited on a platelet or substrate and/or how one or both of the high refractive index layers interact when calcined. Overall, the diffused third material 5 affects the optical properties, in particular the chroma, of the resulting effect pigment.

Partial diffusion of the diffused third material 5 would yield discontinuous pockets 3 of diffused third material 5 due to the fact that the diffused third material 5 is not 100% diffused into one or both the first and second high refractive index layers 1 and 2, respectively.

FIG. 3B shows a few isolated and independent or discontinuous pockets 3 of concentrated diffused third material 5 between the interface surfaces 6 and 7. The discontinuous pockets 3 are not a separate layer extending continuously between the first high refractive index layer 1 and second high refractive index layer 2. In fact, the discontinuous pockets 3 of concentrated diffused third material is not a layer at all, as a continuous layer would not provide the benefits as described herein.

It is further contemplated that the optical coating may further include additional layer(s), such as high reflective index or low refractive index layer(s), above or below the first remote surface 8 or the second remote surface 9. Additionally, a transparent or surface treatment coating may be added as a top layer to protect the effect pigment against weathering and the like. It is also possible to have multiples of the optical coating 11 stacked on top of each other.

All of the examples of the effect pigments disclosed herein may be incorporated into a variety of products and used in a variety of applications. As examples, the effect pigments may be included in paints, ink-jet inks or other printing inks, coatings, automotive coatings, plastics, cosmetic formulations, and glazes for ceramics or glasses compositions.

Thus the effect pigment may comprise the platelet substrate and an optical coating having for example, the structures below.

$Fe_2O_3$/range of diffusion between 100% to partial diffusion $Al_2O_3$/$Fe_2O_3$;

$Fe_2O_3$/range of diffusion between 100% to partial diffusion $SnO_2/Fe_2O_3$;

$Fe_2O_3$/range of diffusion between 100% to partial diffusion $SiO_2/Fe_2O_3$;

$TiO_2$ (rutile or anatase)/range of diffusion between 100% to partial diffusion $Al_2O_3/Fe_2O_3$;

$Fe_2O_3$/range of diffusion between 100% to partial diffusion $Al_2O_3/TiO_2$ (rutile or anatase);

$Fe_2O_3$/range of diffusion between 100% to partial diffusion $SnO_2/TiO_2$ (rutile or anatase);

$TiO_2$ (rutile or anatase)/range of diffusion between 100% to partial diffusion $SnO_2/Fe_2O_3$;

$Fe_2O_3$/range of diffusion between 100% to partial diffusion $SiO_2/TiO_2$ (rutile or anatase);

$TiO_2$ (rutile or anatase)/range of diffusion between 100% to partial diffusion $SiO_2/Fe_2O_3$;

Rutile $TiO_2$/range of diffusion between 100% to partial diffusion $SiO_2$/Rutile $TiO_2$;

$TiO_2$ (rutile or anatase)/range of diffusion between 100% to partial diffusion $SnO_2/TiO_2$ (rutile or anatase); and $TiO_2$ (rutile or anatase)/range of diffusion between 100% to partial diffusion $Al_2O_3/TiO_2$ (rutile or anatase).

The above "diffusion between 100% to partial diffusion of the diffused third material" does not indicate a layer as explained previously but instead is a short hand form of saying the diffused third material has a range of diffusion between 100% to partial diffusion from the interfaces 6 and/or 7 of the first or second high refractive index layers toward the remote surfaces 8 and/or 9 of the high index refractive index layers.

Method of Making the Effect Pigments

The effect pigments disclosed herein are made by coating a platelet 4 with an optical coating 11. It is also contemplated that the platelet may be pretreated with a coating and then subsequently coated with the inventive optical coating 11. Therefore, the inventive optical coating 11 may or may not be in direct contact with the platelet surface but instead may be on a pretreated platelet or pre-coated platelet. The method of forming the inventive optical coating may involve precipitation, co-precipitation or chemical vapor deposition (CVD). Thus the use of the term "deposition" encompasses precipitation, co-precipitation and chemical vapor deposition.

An example of an aqueous precipitation is described below.

An aqueous slurry including the platelet is prepared. In an example, the aqueous slurry includes water and the platelet. This slurry may be heated and stirred. The pH of the slurry may be adjusted to a predetermined pH, depending upon the material to be precipitated onto the platelet (i.e., different precursors to the first or second high refractive index layers or diffused third material can form at different pHs). This pH adjustment may be made by adding a suitable acid or base to the aqueous slurry. After pH adjustment, the pH of the slurry may range from about 1 to about 12.

At the appropriate pH depending upon the material to be precipitated, the first high refractive index layer is precipitated onto the platelet in the aqueous slurry. A precursor of the first high refractive index layer may be added to the aqueous slurry, and the appropriate pH may be maintained by adding an appropriate base/acid. As examples, an aqueous solution of $TiCl_4$ (e.g., 40%) may be a suitable precursor for $TiO_2$, and an aqueous solution of $FeCl_3$ (e.g., 39%) may be a suitable precursor for $Fe_2O_3$. The precursor may be added at a suitable rate while the pH is maintained. The first high refractive index layer coats the platelet from the precipitate or formed metal oxide.

When a desirable amount of the precipitate is formed, the pH may then be adjusted up or down to the appropriate pH in order to introduce the precursor of the diffused third material to the slurry. A suitable acid (e.g., HCl, $H_2SO_4$) may be used to lower the pH, and a suitable base (e.g., NaOH) may be used to raise the pH. At the appropriate pH, a precursor to the diffused third material is added to the aqueous slurry. The amount of the precursor added and timing of precipitation may depend, at least in part, upon the material(s) used in the method and desired range of diffusion. In some examples of the method, it may be desirable to raise the pH when a precursor to a $SiO_2$ diffused third material or a precursor to an $Al_2O_3$ diffused third material is used, and it may be desirable to lower the pH when a precursor to a $SnO_2$ diffused third material is used.

When a desirable amount of diffused third material is added to the slurry, the pH may then be adjusted back to or near the appropriate pH. At this pH, the diffused third material may be precipitated onto the first high refractive index layer. The precipitate, a precursor to the second high refractive index layer may be added to the aqueous slurry, and the pH may be maintained by adding an appropriate base/acid. The precursor may be added at a suitable rate while the pH is maintained. The second high refractive index layer forms on the first high refractive index layer.

When a desirable final shade of the effect pigment is achieved, the slurry may be filtered, and the resulting solids may be washed and calcined. Throughout the method, the aqueous slurry may be stirred.

Although the above example describes a particular method of aqueous precipitation and sequences of additions, the effect pigment embodiments can be accomplished by any number of methods well known to the art skilled such as chemical vapor deposition, aqueous precipitation (as above) and co-precipitation as long as the structure defined by the optical coating is achieved. For example, the addition of the diffused third material can take place subsequent to depositing the first high refractive index layer and prior to precipitating the second high refractive index layer. Alternatively, the addition of the diffused third material can take place during deposition of the first or second high refractive index layers. The diffused third material oxide has a range of diffusion from 100% to partially diffusion into the first high refractive index layer and/or the second high refractive index layer upon precipitation and/or upon calcination. The method disclosed herein may also be used to increase the chroma of an effect pigment at a given hue.

Accordingly, a method for making an effect pigment comprising:

coating a platelet with an optical coating comprising the steps:

depositing a first high refractive index layer on the platelet;

depositing a second high refractive index layer; and depositing a diffused third material subsequent to depositing the first high refractive index layer and prior to depositing the second high refractive index layer or co-depositing a diffused third material during the deposition of the first or second high refractive index layers and the deposited diffused third material has a range of diffusion between 100% to partial diffusion in either or both the first high refractive index layer and the second high refractive index layer, with the proviso that diffused third material is different than the first and second high refractive index layer.

In the method above to make the inventive effect pigment, the first and second high refractive index layers are formed from high index materials having a refractive index of about >1.65, for example the first and second high refractive index layers are selected independently from the group consisting of $SnO_2$, $TiO_2$, $Cr_2O_3$, ZnO, $ZrO_2$, iron oxides (such as $Fe_3O_4$, $Fe_2O_3$), copper oxides, cobalt oxides, manganese oxides, alumina, and mixtures thereof;

the diffused third material is $SiO_2$ or a metal oxide, for example the diffused third material is selected from the group consisting of $Al_2O_3$, $SnO_2$, $SiO_2$, cobalt oxides, magnesium oxide, manganese oxide, copper oxides, iron oxides (i.e., $Fe_2O_3$, $Fe_3O_4$), $B_2O_3$, $TiO_2$, $Cr_2O_3$, ZnO, $ZrO_2$, and mixtures thereof.

An important embodiment is when the third material is $SnO_2$, $SiO_2$ or $Al_2O_3$ and the first and the second high refractive index layers are $Fe_2O_3$ or $TiO_2$ Further, as explained above a method of increasing a chroma at a given hue for an effect pigment is disclosed, comprising:

coating a platelet with an optical coating comprising the steps:

depositing a first high refractive index layer on the platelet substrate;

depositing a second high refractive index layer; and depositing a diffused third material subsequent to depositing the first high refractive index layer and prior to depositing the second high refractive index layer or co-depositing the diffused third material during the deposition of the first or second high refractive index layer and the deposited diffused third material has a range of diffusion between 100% diffusion to partial diffusion in either or both the first high refractive index layer and the second high refractive index layer, with the proviso that the diffused third material is different than the first and second high refractive index layers.

In the method above to increase chroma at a given hue, the first and second high refractive index layers are formed from high index materials having a refractive index of about >1.65, for example the first and second high refractive index materials are selected independently from the group consisting of $SnO_2$, $TiO_2$, $Cr_2O_3$, ZnO, $ZrO_2$, iron oxides (such as $Fe_3O_4$, $Fe_2O_3$), copper oxides, cobalt oxides, manganese oxides, alumina, and mixtures thereof;

the diffused third material is $SiO_2$ or a metal oxide, for example the diffused third material is selected from the group consisting of $Al_2O_3$, $SnO_2$, $SiO_2$, cobalt oxides, magnesium oxide, manganese oxide, copper oxides, iron oxides (i.e., $Fe_2O_3$, $Fe_3O_4$), $B_2O_3$, $TiO_2$, $Cr_2O_3$, ZnO, $ZrO_2$, and mixtures thereof. The diffused third material is especially $SnO_2$, $SiO_2$ or $Al_2O_3$ and the first and the second high refractive index layers are $Fe_2O_3$ or $TiO_2$ In both methods described above when precipitation is used rather than CVD the first and second high refractive index layers and the diffused third material are carried out at pH conditions conducive to the precipitation of the particular material which will vary depending upon the material precipitated.

Where appropriate, a protective layer may be applied on top of the second high refractive index material. As an example, $SiO_2$ (protective) layer can be applied on top of the $TiO_2$ layer (second high refractive index layer). In this example, the following method may be used. A soda water-glass solution is metered into a suspension of the material being coated, which suspension has been heated to about 50° C.-100° C., especially 70° C.-80° C. The pH is maintained at from 4 to 10, preferably from 6.5 to 8.5, by simultaneously adding 10% hydrochloric acid (HCl). After addition of the water-glass solution, stirring is carried out for 30 minutes.

To enhance the weather and light stability, the (multilayer) coated flakes/effect pigments can be, depending on the field of application, subjected to a surface treatment. The surface treatment may facilitate the handling of the pigment, especially its incorporation into various compositions for various applications.

Depending on the conditioning method or intended application, it may be advantageous to add certain amounts of texture-improving agents to the effect pigment before or after the conditioning process, provided that this has no adverse effect on use of the effect pigments for coloring various compositions for various applications. Suitable agents include fatty acids containing at least 18 carbon atoms, for example stearic or behenic acid, or amides or metal salts thereof, especially magnesium salts, and also plasticizers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts ranging from 0.1 to 30% by weight, especially from 2 to 15% by weight, based on the end product.

To further illustrate the present disclosure, examples are given herein. It is to be understood that these examples are provided for illustrative purposes and are not to be construed as limiting the scope of the present disclosure.

EXAMPLES

Example 1

A 6.5% aqueous slurry containing 130 g of mica flakes (avg. particle size about 20 μm) was heated to 82° C. and stirred. The pH of the slurry was adjusted to 1.6 with 28% HCl. Then, 15 g of 20% $SnCl_4.5H_2O$ were added at a rate of 2.0 g/min while the pH was maintained at 1.60 by the addition of 10% NaOH. The slurry was allowed to stir for 30 minutes. 40% $TiCl_4$ was then added at a rate of 2.0 g/min while the pH was maintained at 1.50 by the addition of 35% NaOH. At the desired pearl shade, the pH of the slurry was raised to 7.8 with 35% NaOH. Then, 150 g of 20% $Na_2SiO_3.5H_2O$ were added at a rate of 2.0 g/min while the pH was maintained at 7.80 by the addition of 28% HCl. After the addition of the 20% $Na_2SiO_3.5H_2O$ was complete, the pH of the slurry was adjusted to 1.7 with 28% HCl. Then, 28 g of 20% $SnCl_4.5H_2O$ were added at a rate of 2.0 g/min while the pH was maintained at 1.70 by addition of 10% NaOH. The slurry was allowed to stir for 30 minutes. 40% $TiCl_4$ was then added at a rate of 2.0 g/min while the pH was maintained at 1.50 by the addition of 35% NaOH.

At the desired shade, 50 mL of the slurry was filtered, and the presscake was washed with water and calcined at 850° C. for 20 minutes. The sample was drawn down for color measurement. The resulting hue was 322 and the chroma was 79. The $SiO_2$ wt. % based on the total weight of the calcined optical coating in the effect pigments of Example 1 was 7.4%.

Example 2

Example 2 was run with the same procedure set forth in Example 1, except that 75 g of the 20% $Na_2SiO_3.5H_2O$ was added. At the desired shade, 50 mL of the slurry was filtered, and the presscake washed with water and calcined at 850° C. for 20 min. The sample was drawn down for color measurement. The resulting hue was 321 and the chroma was 79.5. The $SiO_2$ wt. % based on the total weight of the calcined optical coating in the effect pigments of Example 2 was 3.7%.

The effect pigment prepared in Example 2 was added to an acetate lacquer at 5 wt. %, dried, and then cross cut to give a cross sectional sample, which was examined via High Resolution Transmission Electron Microscopy (TEM). This image is shown in FIG. 1A. The same sample was also examined via Energy Dispersive X-Ray Spectroscopy (EDXS) in order to examine the distribution of the various elements coated onto the mica. The plot of the elemental slice is shown in FIG. 1B and clearly shows that $SiO_2$ is at least partially diffused within the $TiO_2$ high refractive index layer.

The TEM micrograph in FIG. 1A, shows the grain structure of the first and second high refractive index material ($TiO_2$) layers (1 and 2) on the mica substrate. The EDXS elemental slice (FIG. 1B), shows that the $SiO_2$ diffused third material does not exist as a distinct layer between the first and second high refractive index materials, but rather as diffused in the second high refractive index layer. Accordingly, the diffused third material is at least partially diffused in one of both of the first and second high refractive index materials.

Example 3

Example 3 was run with the same procedure set forth in Example 1, except that 50 g of the 20% $Na_2SiO_3.5H_2O$ was added. At the desired shade, 50 mL of the slurry was filtered, and the press cake washed with water and calcined at 850° C. for 20 min. The sample was drawn down for color measurement. The resulting hue was 324 and the chroma was 75. The $SiO_2$ wt. % based on the total weight of the calcined optical coating in the effect pigments of Example 2 was 2.5%.

Example 4

Example 4 was run with the same procedure set forth in Example 1, except that 25 g of the 20% $Na_2SiO_3.5H_2O$ was added. At the desired shade, 50 mL of the slurry was filtered, and the press cake washed with water and calcined at 850° C. for 20 min. The sample was drawn down for color measurement. The resulting hue was 322 and the chroma was 76. The $SiO_2$ wt. % based on the total weight of the calcined optical coating in the effect pigments of Example 3 was 1.2%.

Comparative Example 4

Comparative Example 4 was run with the same procedure set forth in Example 1, except that no 20% $Na_2SiO_3.5H_2O$ was added, and the pH was not raised to 7.8. At the desired shade, 50 mL of the slurry was filtered, and the press cake washed with water and calcined at 850° C. for 20 min. The comparative sample was drawn down for color measurement. The resulting hue was 324 and the chroma was 72.

The chroma results for Examples 1-4 and Comparative Example 4 illustrate that higher chroma can be obtained when the $SiO_2$ disclosed herein is at least partially diffused in one or both the high refractive index layers.

Example 5

Example 5 was run with the same procedure set forth in Example 1, except that 125 g of the 20% $Na_2SiO_3.5H_2O$ was added. At the desired shade, 50 mL of the slurry was filtered, and the press cake washed with water and calcined at 850° C. for 20 min. The sample was drawn down for color measurement. The resulting hue was 325.2. The $SiO_2$ wt. % based on the total weight of the calcined optical coating in the effect pigments of Example 5 was 6.1%.

Example 6

Example 6 was run with the same procedure set forth in Example 1, except that 50 g of the 20% $Na_2SiO_3.5H_2O$ was added. At the desired shade, 50 mL of the slurry was filtered, and the press cake washed with water and calcined at 850° C. for 20 min. The sample was drawn down for color measurement. The resulting hue was 324.6. The $SiO_2$ wt. % based on the total weight of the calcined optical coating in the effect pigments of Example 6 was 2.4%.

The pigments of Examples 5 and 6 and Comparative Example 4 were exposed to additional calcination experiments. Each of the press cakes from Examples 5 and 6 and Comparative Example 4 were also calcined at 625° C. for 20 min. Table 1 illustrates the hue measured after the 850° C. calcination, the hue measured after the 625° C. calcination, and the delta hue between the two calcination temperatures.

TABLE 1

| Sample | Hue after 850° C. | Hue after 625° C. | Delta Hue |
|---|---|---|---|
| Comp. Ex. 4 | 324 | 291 | 33 |
| Ex. 5 | 325.2 | 315 | 10.2 |
| Ex. 6 | 324.6 | 321 | 3.6 |

Delta hue is indicative of the amount of densification that the sample undergoes in the subsequent calcination. A large delta hue indicates that the sample underwent more shrinkage/densification during the additional calcination process. For Examples 5 and 6, further calcination did not significantly cause further shrinkage/densification, whereas for Comparative Example 4, further calcination did significantly cause further shrinkage/densification. As such, the results shown in Table 1 indicate that the small amount of $SiO_2$ (diffused third material) of Examples 5 and 6 allowed for a more effective $TiO_2$ deposition. In Comparative Example 4, where no $SiO_2$ was used, a larger delta hue of the $TiO_2$ layer was observed, with 33 hue degrees between the 625° C. and 850° C. calcinations. As such, in order to achieve the desired optical thickness of the coating and hue after calcination for Comparative Example 4, about 19% more of the $TiCl_4$ solution would have to be used.

Based upon these results, one can conclude in this example that the small amount of diffused $SiO_2$ allows the desired thickness of the optical coating (total thickness of first and second refractive index materials and diffused third material), and therefore the target hue, to be obtained, with less $TiCl_4$ solution (or other precursor solution) than would be needed to obtain the same optical thickness and target hue without the diffused $SiO_2$ diffused third material.

Example 7

A 5% aqueous slurry containing 100 g of mica flakes (avg. particle size about 10 μm) was heated to 82° C. and stirred.

The pH of the slurry was adjusted to 1.6 with 28% HCl. Then, 27 g of 20% $SnCl_4 \cdot 5H_2O$ were added at a rate of 0.8 g/min while the pH was maintained at 1.60 by the addition of 35% NaOH. The slurry was allowed to stir for 90 minutes before adding 40% $TiCl_4$ at a rate of 1.1 g/min while the pH was maintained at 1.60 by the addition of 35% NaOH.

At the desired pearl shade, the pH of the slurry was raised to 7.8 with 35% NaOH. Then, 40 g of 20% $Na_2SiO_3 \cdot 5H_2O$ were added at a rate of 0.5 g/min while the pH was maintained at 7.80 by the addition of 28% HCl. After the addition of the 20% $Na_2SiO_3 \cdot 5H_2O$ was complete, the pH of the slurry was adjusted to 1.6 with 28% HCl. Then, 40 g of 20% $SnCl_4 \cdot 5H_2O$ were added at a rate of 0.5 g/min while the pH was maintained at 1.60 by addition of 35% NaOH. The slurry was allowed to stir for 30 minutes before adding 40% $TiCl_4$ at a rate of 1.1 g/min while the pH was maintained at 1.60 by the addition of 35% NaOH.

At the desired shade, 60 mL of the slurry was filtered, and the press cake was washed with water and calcined at 850° C. for 20 minutes. The sample was drawn down for color measurement. The resulting hue was 277 and the chroma was 68. The $SiO_2$ level in the coated oxides is 1.48%. Based on powder X-ray diffraction, 100% of the $TiO_2$ is in the rutile phase.

Comparative Example 7

This comparative example was conducted as in Example 7, except that no 20% $SnCl_4 \cdot 5H_2O$ solution was added for the second layer of $TiO_2$ after the addition of the 20% $Na_2SiO_3 \cdot 5H_2O$ solution.

The resulting hue was 276 and the chroma was 58. The $SiO_2$ level in the coated oxides is 2.30%. Based on powder X-ray diffraction, 72% of the $TiO_2$ is in the rutile phase, and 28% of the $TiO_2$ is in the anatase phase. Thus the second layer of $TiO_2$ is in the anatase phase.

Example 8

A 5% aqueous slurry containing 100 g of mica flakes (avg. particle size about 20 μm) was heated to 82° C. and stirred. The pH of the slurry was adjusted to 3.2 with 28% HCl. Then, 39% $FeCl_3$ was added at a rate of 1.3 g/min while the pH was maintained at 3.2 by the addition of 35% NaOH.

At the desired bronze shade, the pH of the slurry was raised to 6.0 with 35% NaOH, and the slurry cooled to 30° C. Then, 25 g of 20% $Na_2Al_2O_4$ were added at a rate of 0.5 g/min while the pH was maintained at 6.0 by the addition of 25% $H_2SO_4$. After the addition was complete, the pH of the slurry was adjusted to 3.2 with 28% HCl, and the slurry was heated to 82° C. 39% $FeCl_3$ was added at a rate of 1.3 g/min while the pH was maintained at 3.2 by the addition of 35% NaOH.

At the desired shade, 55 mL of the slurry was filtered, and the press-cake washed with water and calcined at 850° C. for 20 min. The sample was drawn down for color measurement. The resulting hue was 49.7 and the chroma was 87.8. The $Al_2O_3$ wt. % based on the total weight of the calcined optical coating in the effect pigments of Example 8 was 4%.

Figure 2A:
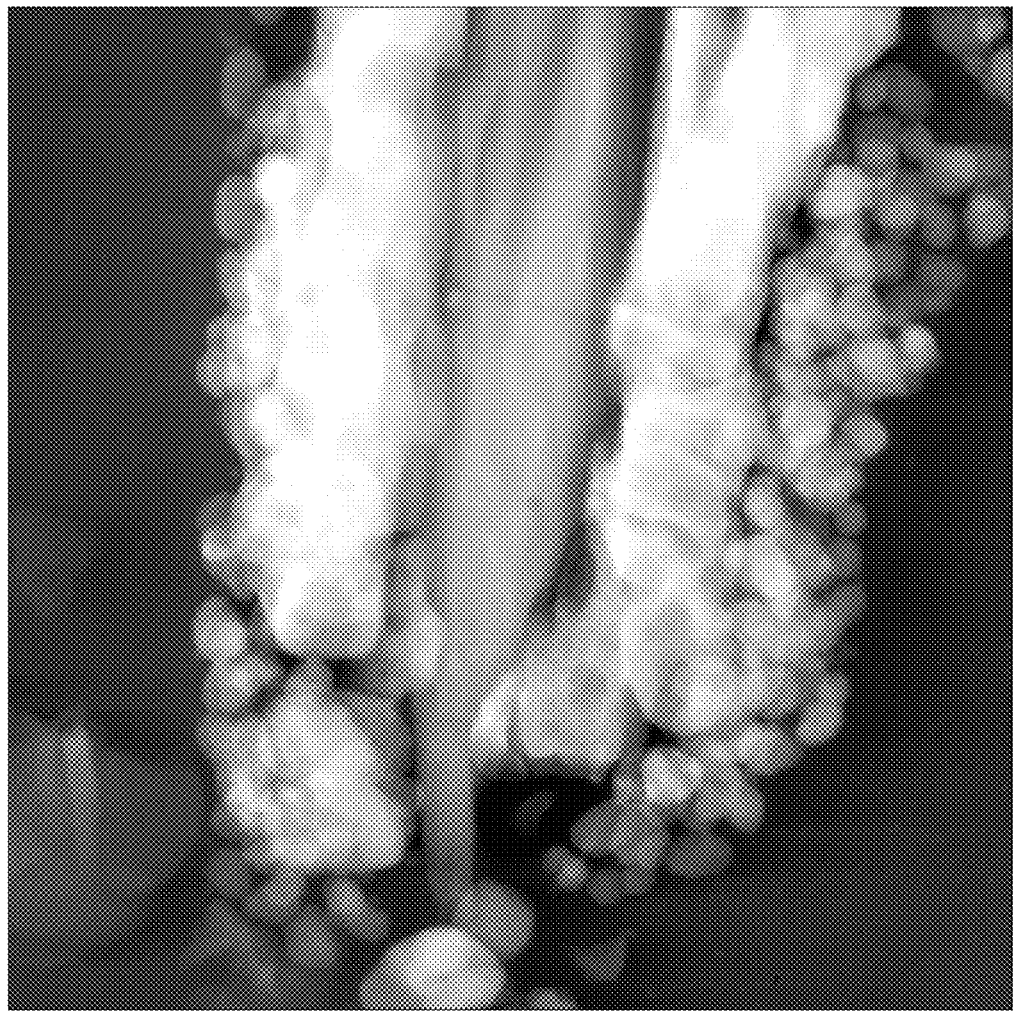
FIG. 2A is a High Resolution Transmission Electron Micrograph (TEM) of a cross-section of the effect pigment prepared in Example 8, the magnification was 200,000.
Figure 2B:
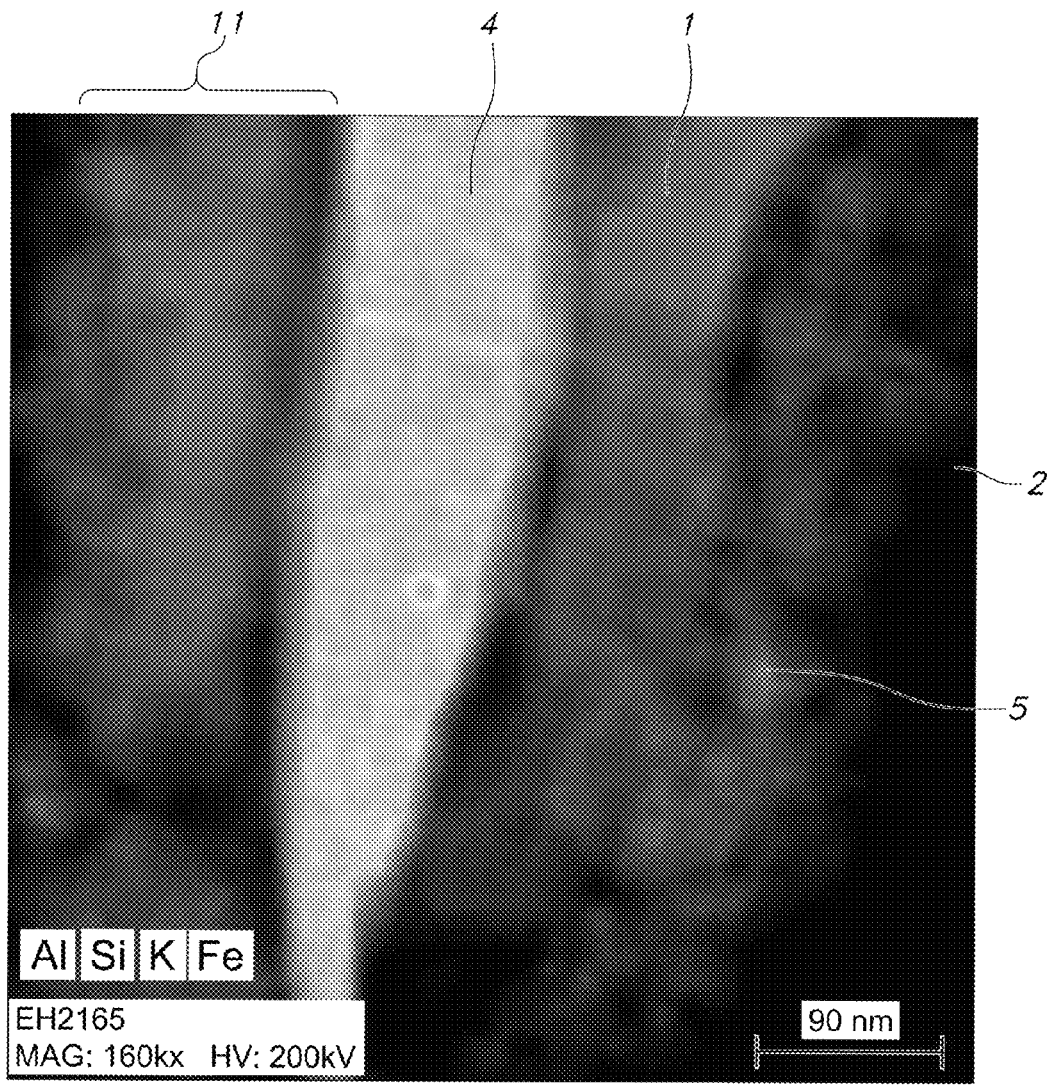
FIG. 2B is an Energy Dispersive X-Ray Spectroscopy (EDXS) image in tandem with the TEM of the cross-section of the effect pigment shown in FIG. 2A.

The effect pigment prepared in Example 8 was added to an acetate lacquer at 5 wt. %, dried, and then cross cut to give a cross sectional sample, which was examined via High Resolution Transmission Electron Microscopy (TEM). This image is shown in FIG. 2A. The same sample was also examined via Energy Dispersive X-Ray Spectroscopy (EDXS) in order to examine the distribution of the various elements coated onto the mica. This image is shown in FIG. 2B. In FIG. 2A, there is clearly a 70 nm to 95 nm dense hematite coating formed on the mica substrate. Adjacent to this dense layer of hematite is 20 nm to 50 nm of spherical, loosely arranged particles of iron oxide (hematite). As evidenced by the EDXS (FIG. 2B), the aluminum oxide 5 is diffused into the spherical iron oxide particles of hematite 2. Additionally, it is also clear that the aluminum oxide deposition does not lead to a separate interlayer or coating between the two first and second high refractive index materials 1 and 2 but instead shows the aluminum oxide to be completely diffused in the second high refractive index material 2 and the diffusion occurs between the interface 7 and remote surface 9 of the second high refractive index layer 2.

Example 9

A 5% aqueous slurry containing 100 g of mica flakes (avg. particle size about 20 μm) was heated to 82° C. and stirred. The pH of the slurry was adjusted to 3.2 with 28% HCl. Then, 39% $FeCl_3$ was added at a rate of 1.3 g/min while the pH was maintained at 3.2 by the addition of 35% NaOH.

At the desired bronze shade, the pH of the slurry was lowered to 1.5 with 28% HCl. Then, 60 g of 20% $SnCl_4 \cdot 5H_2O$ were added at a rate of 1.0 g/min while the pH was maintained at 1.5 by the addition of 35% NaOH. After the addition was complete, the pH of the slurry was adjusted to 3.2 with 35% NaOH. 39% $FeCl_3$ was added at a rate of 1.3 g/min while the pH was maintained at 3.2 by the addition of 35% NaOH.

At the desired shade, 55 mL of the slurry was filtered, and the press-cake washed with water and calcined at 850° C. for 20 min. The sample was drawn down for color measurement. The resulting hue was 52.7 and the chroma was 96. The $SnO_2$ wt. % based on the total weight of the calcined optical coating in the effect pigments of Example 9 was 6%.

Figure 3A:
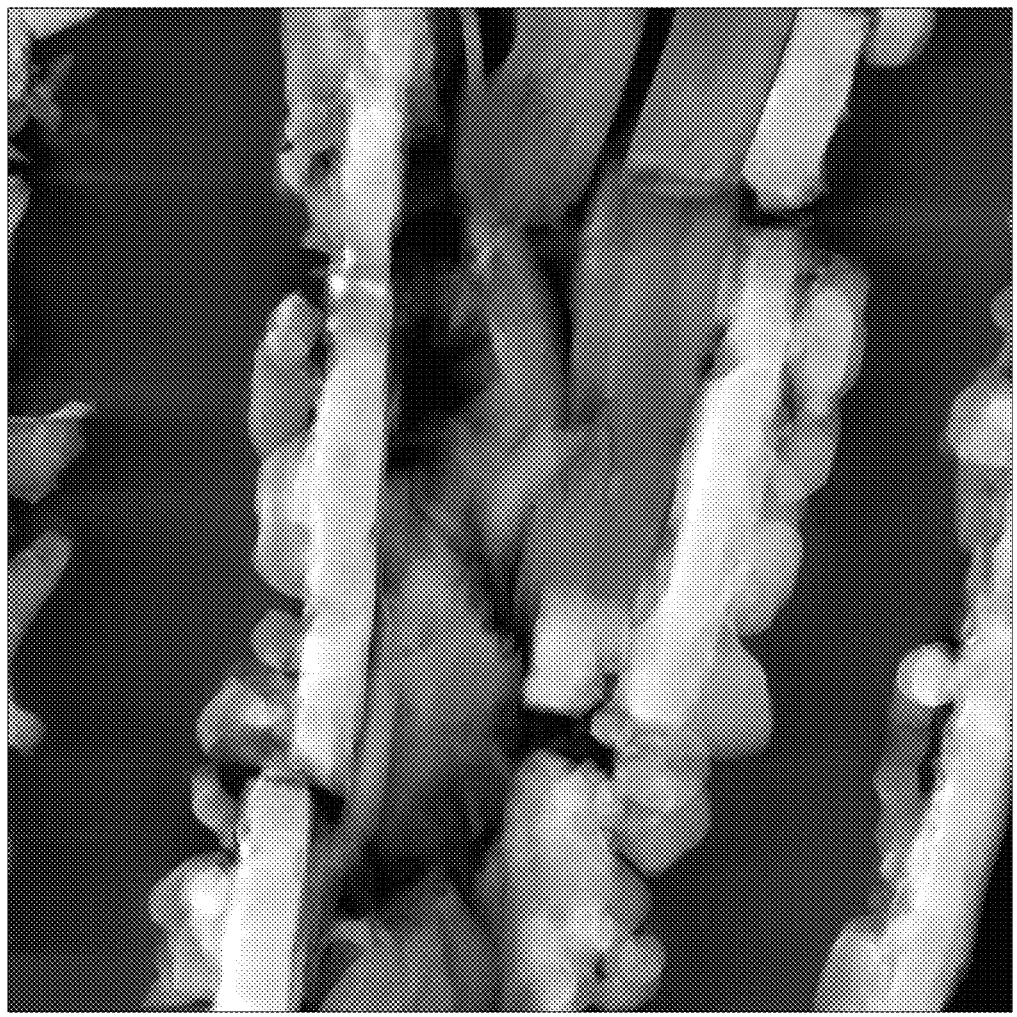
FIG. 3A is a High Resolution Transmission Electron Micrograph (TEM) of a cross-section of the effect pigment prepared in Example 9 the magnification at 200,00.
Figure 3B:
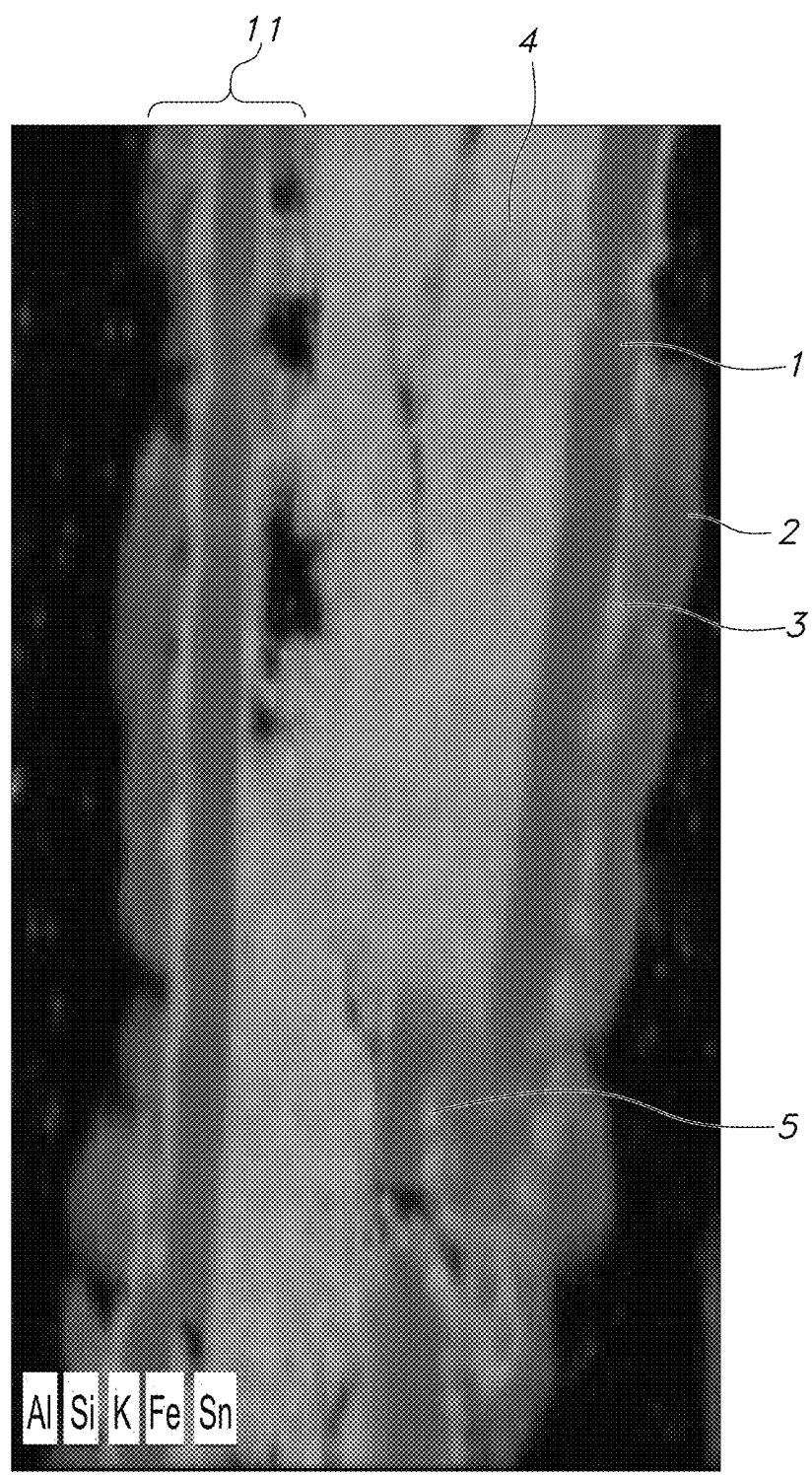
FIG. 3B is an Energy Dispersive X-Ray Spectroscopy (EDXS) image in tandem with the TEM of a cross-section of the effect pigment shown in FIG. 3A.
Figure 4A:
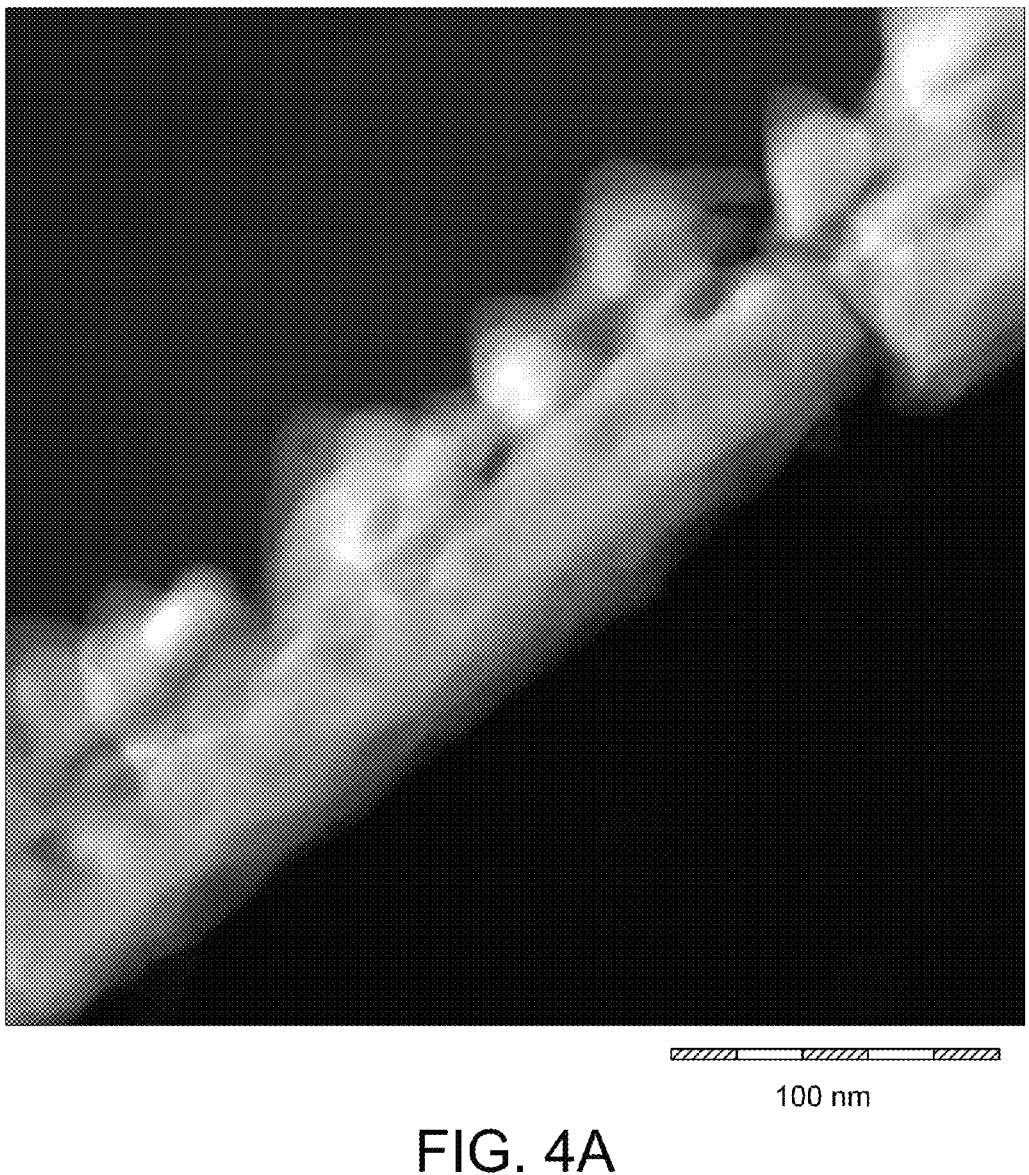
FIG. 4A is a High Resolution Transmission Electron Micrograph (TEM) of a cross-section of the effect pigment prepared in Example 13 at magnification 200000.
Figure 4B:
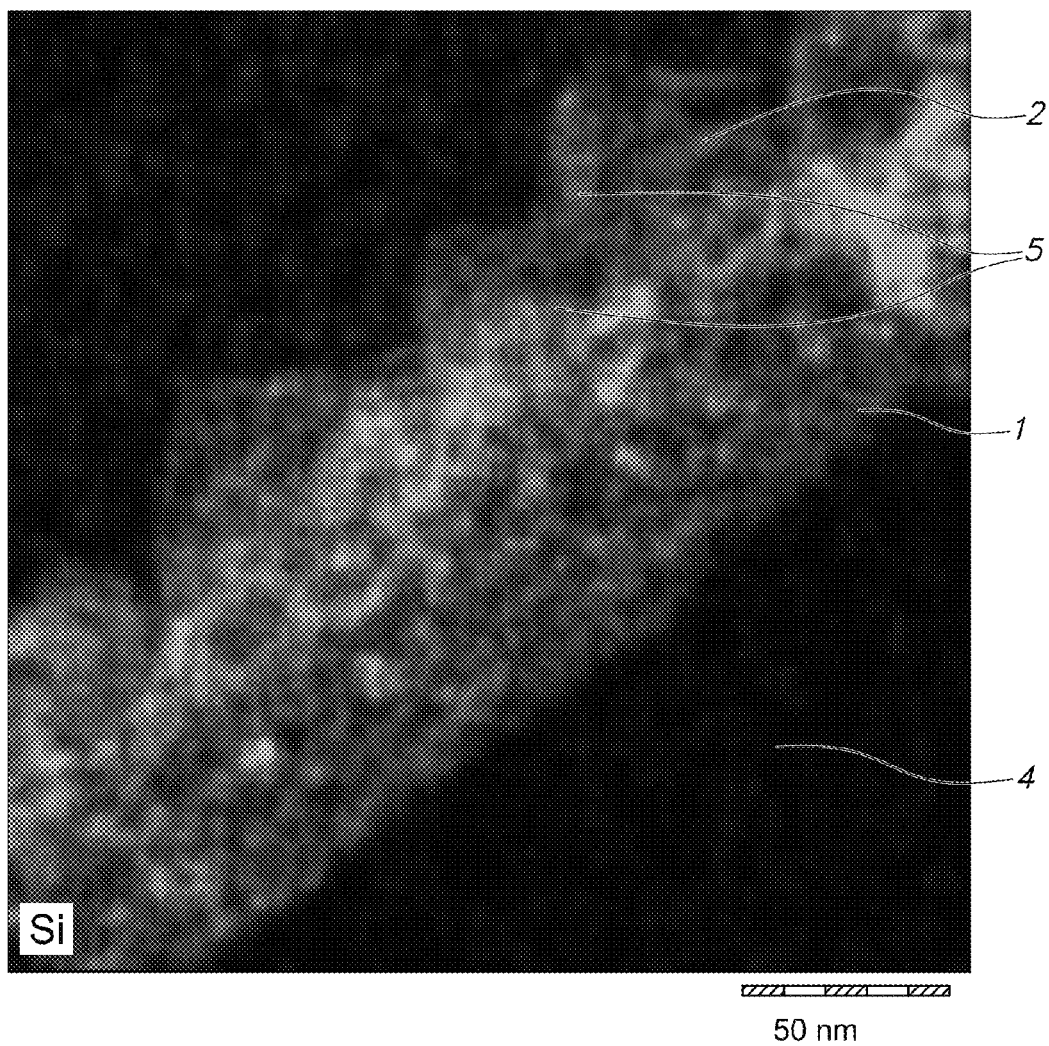
FIG. 4B is an Energy Dispersive X-Ray Spectroscopy (EDXS) images in tandem with TEM of a cross-section of the effect pigment shown in FIG. 4A.

See FIGS. 3A and 3B. The hematite outer layer is similar to that in FIGS. 2A and 2B. It is less dense than the first $Fe_2O_3$ layer. The $SnO_2$ is partially diffused in the $Fe_2O_3$ layer. See FIG. 3B element 3.

Example 10

A 5% aqueous slurry containing 100 g of mica flakes (avg. particle size about 20 μm) was heated to 82° C. and stirred. The pH of the slurry was adjusted to 1.5 with 28% HCl. Then, 20% $SnCl_4 \cdot 5H_2O$ was added at a rate of 0.8 g/min while the pH was maintained at 1.5 by the addition of 10% NaOH. The solution was stirred for 30 minutes and then 40% $TiCl_4$ was added at a rate of 1.9 g/min. The pH was maintained at 1.5 by the addition of 35% HCl.

At the desired pearl shade, the reactor was cooled to 30° C. and the pH was raised to 6.0 with 35% NaOH. Then, 25 g of 20% $Na_2Al_2O_4$ were added at a rate of 0.5 g/min while the pH was maintained at 6.0 by the addition of 25% $H_2SO_4$. After the addition was complete, the slurry was heated to 82° C. The pH of the slurry was adjusted to 3.2 with 39% $FeCl_3$, and the $FeCl_3$ was added at a rate of 1.3 g/min. The pH was maintained at 3.2 by the addition of 35% NaOH.

At the desired shade, 55 mL of the slurry was filtered, and the press-cake washed with water and calcined at 850° C. for 20 min. The sample was drawn down for color measurement. The resulting hue was 48 and the chroma was 79. The $Al_2O_3$ wt. % based on the total weight of the calcined optical coating in the effect pigments of Example 10 was 2%.

Comparative Example 11

Mica Coated with $Fe_2O_3$

A 16% aqueous slurry containing 160 g of mica flakes (avg. particle size about 20 μm) was heated to 76° C. and stirred. The pH of the slurry was adjusted to 3.3 with 28% HCl. Then, 39% $FeCl_3$ was added at a rate of 1.3 g/min while the pH was maintained at 3.3 by addition of 35% NaOH. No $Al_2O_3$ or $SnO_2$ precursor was used.

At the desired shade, 55 mL of the slurry was filtered, and the press-cake washed with water and calcined at 850° C. for 20 min. The comparative sample was drawn down for color measurement. The resulting hue was 53.9 and the chroma was 66.

Example 12

A 10% aqueous slurry containing 200 g of mica flakes (avg. particle size about 10 μm) was heated to 82° C. and stirred. The pH of the slurry was adjusted to 3.2 with 28% HCl. Then, 39% $FeCl_3$ was added at a rate of 2.0 g/min while the pH was maintained at 3.2 by the addition of 35% NaOH.

At the desired bronze shade, the pH of the slurry was raised to 6.0 with 35% NaOH, and the slurry cooled to 30° C. Then, 60 g of 20% $Na_2Al_2O_4$ were added at a rate of 1.5 g/min while the pH was maintained at 6.0 by the addition of 25% $H_2SO_4$. After the addition was complete, the pH of the slurry was adjusted to 3.2 with 28% HCl, and the slurry was heated to 82° C. 39% $FeCl_3$ was added at a rate of 2.0 g/min while the pH was maintained at 3.2 by the addition of 35% NaOH.

At the desired shade, 55 mL of the slurry was filtered, and the press-cake washed with water and calcined at 850° C. for 20 min. The sample was drawn down for color measurement. The resulting hue was 59.3 and the chroma was 78.2. The $Al_2O_3$ wt. % based on the total weight of the calcined optical coating in the effect pigments of Example 11 was 3%.

Comparative Example 13

A 20% aqueous slurry containing 400 g of mica flakes (avg. particle size about 10 μm) was heated to 76° C. and stirred. The pH of the slurry was adjusted to 3.3 with 28% HCl. Then, 39% $FeCl_3$ was added at a rate of 2.0 g/min while the pH was maintained at 3.3 by the addition of 35% NaOH. No $Al_2O_3$ or $SnO_2$ precursor was used.

At the desired shade, 55 mL of the slurry was filtered, the press-cake washed with water, and calcined at 850° C. for 20 min. The comparative sample was drawn down for color measurement. The resulting hue was 59.9 and the chroma was 53.4.

Each of examples 8, 9 and 10-12 included $Fe_2O_3$ as the high refractive index layers in the optical coating. Example 10 included rutile $TiO_2$ and $Fe_2O_3$ as the high refractive index materials in the optical coating. Table 2 illustrates the diffused third material used (if any), the weight percent of the diffused third material, the substrate particle size, the hue, and the chroma for each of Examples 8, 9, 10, and 11, and Comparative Examples 10 and 12 after the 850° C. calcination.

Example 14

A 10% aqueous slurry containing 200 g of mica flakes (avg. particle size about 10 μm) was heated to 82° C. and stirred. The pH of the slurry was adjusted to 3.2 with 28% HCl. Then, 39% $FeCl_3$ was added at a rate of 2.0 g/min while the pH was maintained at 3.2 by the addition of 35% NaOH.

At the desired bronze shade, the pH of the slurry was raised to 7.8 with 35% NaOH. Then, 60 g of 20% $Na_2SiO_3$ were added at a rate of 0.5 g/min while the pH was maintained at 7.8 by the addition of 28% HCl. After the addition was complete, the pH of the slurry was adjusted to 3.2 with 28% HCl. 39% $FeCl_3$ was added at a rate of 2.0 g/min while the pH was maintained at 3.2 by the addition of 35% NaOH.

At the desired shade, 55 mL of the slurry was filtered, and the press-cake washed with water and calcined at 850° C. for 20 min. The sample was drawn down for color measurement. The resulting hue was 60.23 and the chroma was 76.82. The $SiO_2$ wt. % based on the total weight of the calcined optical coating in the effect pigments of was 2.2%.

TABLE 2

| Sample | Diffused third material | as Wt. % of total optical coating | Substrate Particle Size (μm) | Hue after 850° C. | Chroma after 850° C. |
|---|---|---|---|---|---|
| Ex. 8 | $Al_2O_3$ | 4 | 20 | 49.7 | 87.8 |
| Ex. 9 | $SnO_2$ | 6 | 20 | 52.7 | 96 |
| Ex. 10 | $Al_2O_3$ | 2 | 20 | 48 | 79 |
| Comp. Ex. 11 | None | 0 | 20 | 53.9 | 66 |
| Ex. 12 | $Al_2O_3$ | 3 | 10 | 59.3 | 78.2 |
| Comp. Ex. 13 | None | 0 | 10 | 59.9 | 53.4 |
| Ex. 14 | $SiO_2$ | 2.2 | 10 | 60.23 | 76.82 |

Comparing Examples 8, 9, 10, 12 and 14 with Comparative Examples 11 and 13, one can conclude that hematite ($Fe_2O_3$) or hematite and rutile titanium dioxide ($TiO_2$) with $Al_2O_3$ $SnO_2$ or $SiO_2$ as diffused third materials significantly enhances the chroma of the resulting pigment. As such, the method disclosed herein may be used for increasing chroma at a given hue for an effect pigment. From these results, one may also conclude that the size of the underlying substrate does not deleteriously affect the enhancement in the chroma.

Example 15

An 11.5% aqueous slurry containing 230 g of glass flake (avg. particle size about 45 microns) was heated to 80° C. and stirred. The pH of the slurry was adjusted to 1.4 with 28% HCl, and 20% $SnCl_4.5H_2O$ was added at a rate of 2.2 g/min. The pH was maintained at 2.2 by the addition of 35% NaOH. The solution was stirred for 30 minutes and then 40% $TiCl_4$ was added at pH of 1.4. The pH was maintained at 2.2 by the addition of 35% HCl.

At the desired pearl shade, the pH was raised to 3.2 with 35% NaOH. 39% $FeCl_3$ was added at 1.1 g/min, and the pH was maintained at 3.2 with 35% NaOH. At the desired bronze shade, the pH was lowered to 1.4 with 28% HCl, and 80 g of 20% $SnCl_4.5H_2O$ was added at 2.2 g/min while maintaining the pH at 1.4 with 35% NaOH. After the addition was complete, the pH of the slurry was adjusted to 3.2 with 35% NaOH. 39% $FeCl_3$ was added at a rate of 1.1 g/min while maintaining the pH at 3.2 by the addition of 35% NaOH.

At the desired shade, 55 mL of the slurry was filtered, the press-cake washed with water, and calcined at 625° C. for 20 min. The sample was drawn down for color measurement. The resulting hue was 65 and the chroma was 67.

The $SnO_2$ diffused third material wt. % based on the total weight of the calcined optical coating in the effect pigments of Example 14 was 7%. The total weight of the calcined optical coating in this Example included 77% $Fe_2O_3$, 14% $SnO_2$ (7% $SnO_2$ as rutile director and 7% as diffused third material), and 9% $TiO_2$.

Example 16

A 10% aqueous slurry containing 200 g of mica flakes (avg. particle size about 10 μm) was heated to 76° C. and stirred. The pH of the slurry was adjusted to 3.2 with 28% HCl. Then, 39% FeCl₃ was added at a rate of 2.0 g/min while the pH was maintained at 3.2 by the addition of 35% NaOH.

At the desired bronze shade, the pH of the slurry was raised to 7.8 with 35% NaOH. Then, 60 g of 20% Na₂SiO₃ were added at a rate of 0.5 g/min while the pH was maintained at 7.8 by the addition of 28% HCl. After the addition was complete, the pH of the slurry was adjusted to 3.2 with 28% HCl. 100 g of 39% FeCl₃ was added at a rate of 2.0 g/min while the pH was maintained at 3.2 by the addition of 35% NaOH.

At the desired shade, 55 mL of the slurry was filtered, and the press-cake washed with water and calcined at 850° C. for 20 min. The sample was drawn down for color measurement. The resulting hue was 68.34 and the chroma was 48. The SiO₂ wt. % based on the total weight of the calcined optical coating in the effect pigments was 6.5%.

Comparative Example 17

A 5% aqueous slurry containing 100 g of mica flakes (avg. particle size about 10 μm) was heated 82° C. and stirred. The pH of the slurry was adjusted to 3.2 with 28% HCl. Then, 39% FeCl₃ was added at a rate 1.0 g/min while the pH was maintained at 3.2 by the addition of 35% NaOH.

At the desired bronze shade, the pH of the slurry was raised to 7.8 with 35% NaOH. Then, 702 g of 20% Na₂SiO₃ were added at a rate of 0.5 g/min while the pH was maintained at 7.8 by the addition of 28% HCl. 300 g of 39% FeCl₃ was added at a rate of 1.0 g/min while the pH was maintained at 3.2 by the addition of 35% NaOH.

At the desired shade, 55 mL of the slurry was filtered, and the press-cake washed with water and calcined at 850° C. for 20 min. The sample was drawn down for color measurement. The resulting hue was 68.95 and the chroma was 47.45. The SiO₂ wt. % based on the total weight of the calcined optical coating in the effect pigments of was 25.4%.

Comparing example 16 with comparative example 17 shows that there is quicker color progression using the present process. Note that example 16 shows that 60 g of SiO₂ and 100 g of ferric chloride is required to reach a hue of 68 on 200 g of mica, whereas in a typical multi-layer stack 700 g of SiO₂ and 300 g of ferric chloride on 100 g of mica are needed to reach the same hue.

Reference throughout the specification to "one example", "another example", "an example", "an embodiment", and so forth, means that a particular element (e.g., feature, structure, and/or characteristic) described in connection with the example/embodiment is included in at least one example/embodiment described herein, and may or may not be present in other examples/embodiments. In addition, it is to be understood that the described elements for any example/embodiment may be combined in any suitable manner in the various examples/embodiments, unless the context clearly dictates otherwise.

It is to be understood that the ranges provided herein include the stated range and any value or sub-range within the stated range. For example, a range from about 10 nm to about 700 nm should be interpreted to include not only the explicitly recited limits of about 10 nm to about 700 nm but also to include individual values, such as 11 nm, 125 nm, 404.5 nm, etc., and sub-ranges, such as from about 15 nm to about 400 nm, from about 30 nm to about 375 nm, etc. Furthermore, when "about" is utilized to describe a value, this is meant to encompass minor variations (up to +/−10%) from the stated value.

While several examples have been described in detail, it is to be understood that the disclosed examples may be modified. Therefore, the foregoing description is to be considered non-limiting.

What is claimed is:

1. An effect pigment comprising a platelet coated with an optical coating, wherein the optical coating comprises:
   a first high refractive index layer;
   a second high refractive index layer formed on the first high refractive index layer; and
   a diffused third material;
   wherein:
      the first high refractive index layer is adjacent and at least partially in contact with the second high refractive index layer;
      the first and second high refractive index layers are formed from materials having a refractive index of about >1.65;
      the diffused third material is partially diffused and includes isolated discontinuous pockets of the diffused third material between the first and second high refractive index layers;
      the diffused third material comprises SiO₂ or a metal oxide; and
      the diffused third material is different from the first and second high refractive index layers.

2. The effect pigment according to claim 1, wherein the first and second high refractive index layers are selected from the group consisting of SnO₂, TiO₂, Cr₂O₃, ZnO, ZrO₂, Fe₂O₃, Fe₃O₄, copper oxides, cobalt oxides, manganese oxides, alumina, and mixtures thereof.

3. The effect pigment according to claim 1, wherein the diffused third material is selected from the group consisting of Al₂O₃, SnO₂, SiO₂, cobalt oxides, magnesium oxide, manganese oxide, copper oxides, Fe₂O₃, Fe₃O₄, B₂O₃, TiO₂, Cr₂O₃, ZnO, ZrO₂, and mixtures thereof.

4. The effect pigment according to claim 1, wherein the first and second high refractive index layers are TiO₂ and the diffused third material is SiO₂.

5. The effect pigment according to claim 1, wherein:
   the first and/or second high refractive index layers comprise Fe₂O₃ and the diffused third material comprises Al₂O₃/Fe₂O₃, Al₂O₃/TiO₂ (rutile or anatase), SnO₂/Fe₂O₃, SiO₂/Fe₂O₃, SnO₂/TiO₂ (rutile or anatase), or SiO₂/TiO₂ (rutile or anatase);
   the first and/or second high refractive index layers comprise TiO₂ (rutile or anatase) and the diffused third material comprises Al₂O₃/Fe₂O₃, Al₂O₃/TiO₂ (rutile or anatase), SnO₂/Fe₂O₃, SiO₂/Fe₂O₃, or SnO₂/TiO₂ (rutile or anatase); or
   the first and/or second high refractive index layers comprise Rutile TiO₂ and the diffused third material comprises SiO₂/Rutile TiO₂.

6. The effect pigment according to claim 1, wherein the platelet is selected from the group consisting of aluminum oxide, platy glass, perlite, aluminum, natural mica, synthetic mica, bismuth oxychloride, platy iron oxide, platy graphite, platy silica, bronze, stainless steel, natural pearl, boron nitride, copper flake, copper alloy flake, zinc flake, zinc alloy flake, zinc oxide, enamel, china clay, porcelain, titanium oxide, platy titanium dioxide, titanium suboxide, zeolites, talc, kaolin, synthetic ceramic flakes, and combinations thereof.

7. The effect pigment according to claim 1, wherein the diffused third material is present in the optical coating in an amount ranging from about 0.5 wt. % to about 11 wt. %, based on the total weight of the optical coating after calcination.

8. The effect pigment according to claim 1, wherein a total physical thickness after calcination of the optical coating ranges from about 10 nm to about 700 nm.

9. The effect pigment according to claim 1 wherein the platelet diameter ranges from about 1 μm (micron) to about 1 mm (millimeter).

10. A paint, ink-jet ink, coating, automotive coating, printing ink, plastic, cosmetic, glaze for ceramics or glass compositions containing the effect pigments according to claim 1.

11. The composition according to claim 10, wherein the composition is an automotive coating.

12. A method of making an effect pigment according to claim 1 comprising coating a platelet with an optical coating comprising the steps:
   depositing the first high refractive index material layer on the platelet;
   depositing the second high refractive index layer; and
   depositing the diffused third material subsequent to depositing the first high refractive index layer and prior to depositing the second high refractive index layer; or
   co-depositing the diffused third material during the deposition of the first high refractive index layer or second high refractive index layer.

13. The method according to claim 12, wherein the method increases a chroma at a given hue for the effect pigment.

14. The effect pigment according to claim 4, wherein the first and second $TiO_2$ layers are rutile $TiO_2$.

15. An effect pigment comprising a platelet coated with an optical coating, wherein the optical coating comprises:
   a first high refractive index layer;
   a second high refractive index layer formed on the first high refractive index layer; and
   a diffused third material;
   wherein:
      the first high refractive index layer is adjacent and in contact with the second high refractive index layer;
      the first and second high refractive index layers are formed from materials having a refractive index of about >1.65;
      the diffused third material is diffused 100% into one or both of the first and the second high refractive index layers;
      the diffused third material comprises $SiO_2$ or a metal oxide; and
      the diffused third material is different from the first and second high refractive index layers.

16. The effect pigment according to claim 15, wherein the first and second high refractive index layers are selected from the group consisting of $SnO_2$, $TiO_2$, $Cr_2O_3$, $ZnO$, $ZrO_2$, $Fe_2O_3$, $Fe_3O_4$, copper oxides, cobalt oxides, manganese oxides, alumina, and mixtures thereof.

17. The effect pigment according to claim 15, wherein the diffused third material is selected from the group consisting of $Al_2O_3$, $SnO_2$, $SiO_2$, cobalt oxides, magnesium oxide, manganese oxide, copper oxides, $Fe_2O_3$, $Fe_3O_4$, $B_2O_3$, $TiO_2$, $Cr_2O_3$, $ZnO$, $ZrO_2$, and mixtures thereof.

18. The effect pigment according to claim 15, wherein the first and second high refractive index layers are $TiO_2$ and the diffused third material is $SiO_2$.

19. The effect pigment according to claim 18, wherein the first and second $TiO_2$ layers are rutile $TiO_2$.

20. The effect pigment according to claim 15, wherein:
   the first and/or second high refractive index layers comprise $Fe_2O_3$ and the diffused third material comprises $Al_2O_3/Fe_2O_3$, $Al_2O_3/TiO_2$ (rutile or anatase), $SnO_2/Fe_2O_3$, $SiO_2/Fe_2O_3$, $SnO_2/TiO_2$ (rutile or anatase), or $SiO_2/TiO_2$ (rutile or anatase);
   the first and/or second high refractive index layers comprise $TiO_2$ (rutile or anatase) and the diffused third material comprises $Al_2O_3/Fe_2O_3$, $Al_2O_3/TiO_2$ (rutile or anatase), $SnO_2/Fe_2O_3$, $SiO_2/Fe_2O_3$, or $SnO_2/TiO_2$ (rutile or anatase); or
   the first and/or second high refractive index layers comprise Rutile $TiO_2$ and the diffused third material comprises $SiO_2$/Rutile $TiO_2$.

21. The effect pigment according to claim 15, wherein the platelet is selected from the group consisting of aluminum oxide, platy glass, perlite, aluminum, natural mica, synthetic mica, bismuth oxychloride, platy iron oxide, platy graphite, platy silica, bronze, stainless steel, natural pearl, boron nitride, copper flake, copper alloy flake, zinc flake, zinc alloy flake, zinc oxide, enamel, china clay, porcelain, titanium oxide, platy titanium dioxide, titanium suboxide, zeolites, talc, kaolin, synthetic ceramic flakes, and combinations thereof.

22. The effect pigment according to claim 15, wherein the diffused third material is present in the optical coating in an amount ranging from about 0.5 wt. % to about 11 wt. %, based on the total weight of the optical coating after calcination.

23. The effect pigment according to claim 15, wherein a total physical thickness after calcination of the optical coating ranges from about 10 nm to about 700 nm.

24. The effect pigment according to claim 15, wherein the platelet diameter ranges from about 1 μm (micron) to about 1 mm (millimeter).

25. A method of making an effect pigment according to claim 15 comprising coating a platelet with an optical coating comprising the steps:
   depositing the first high refractive index material layer on the platelet;
   depositing the second high refractive index layer; and
   depositing the diffused third material subsequent to depositing the first high refractive index layer and prior to depositing the second high refractive index layer; or
   co-depositing the diffused third material during the deposition of the first high refractive index layer or second high refractive index layer.

26. The method according to claim 25, wherein the method increases a chroma at a given hue for the effect pigment.

* * * * *